United States Patent [19]
Maki et al.

[11] Patent Number: 5,138,629
[45] Date of Patent: Aug. 11, 1992

[54] DIRECT CURRENT ELECTRIC ARC FURNACE

[75] Inventors: Toshimichi Maki; Takato Matsuo, both of Kawasaki, Japan

[73] Assignee: NKK Corporation, Tokyo, Japan

[21] Appl. No.: 601,997

[22] Filed: Oct. 23, 1990

[30] Foreign Application Priority Data

Oct. 23, 1989 [JP] Japan .................... 1-273666

[51] Int. Cl.$^5$ .................... H05B 7/22
[52] U.S. Cl. .................... 373/64; 373/60; 373/61; 373/62; 373/63; 373/70; 373/102; 373/104; 373/105; 373/108
[58] Field of Search .................... 373/60-64, 373/70, 104, 102, 103, 105, 108

[56] References Cited

U.S. PATENT DOCUMENTS

| | | | |
|---|---|---|---|
| 586,822 | 7/1897 | Patten | 373/64 |
| 1,094,381 | 4/1914 | Wilmowsky | 373/64 |
| 1,889,907 | 12/1932 | Terry | 373/65 |
| 3,264,095 | 8/1966 | Ackermann | 373/65 |
| 3,301,640 | 1/1967 | Turbett | 373/65 |

FOREIGN PATENT DOCUMENTS

| | | | |
|---|---|---|---|
| 54890 | 2/1990 | Japan | 373/104 |
| 54891 | 2/1990 | Japan | 373/104 |
| 54892 | 2/1990 | Japan | 373/104 |
| 54893 | 2/1990 | Japan | 373/104 |
| 26301 | 10/1915 | Sweden | 373/64 |

Primary Examiner—Bruce A. Reynolds
Assistant Examiner—Tu Hoang
Attorney, Agent, or Firm—Frishauf, Holtz, Goodman & Woodward

[57] ABSTRACT

The invention provides a direct current electric arc furnace which is composed of a feeding system of direct current to the furnace, a movable electrode at the roof of the furnace, and a bottom electrode attached to the bottom of the furnace at the position deviated from the center of the bottom of the furnace, the deviated distance from the center being determined by a magnetic field, generated by a current in the steel bath of the furnace, from under an arc generated by the movable electrode to the bottom electrode, which can cancel a second magnetic field generated by the current of the feeding system.

13 Claims, 4 Drawing Sheets

DIRECT CURRENT ELECTRIC ARC FURNACE

BACKGROUND OF THE INVENTION

1. Field of the Invention

The invention is related to the field of metallurgy. The invention is related to the field of a direct current electric arc furnace for steel making.

2. Description of the Related Art

In the conventional way of steel making using an electric arc furnace having considerable capacity, an alternating current electric arc furnace is utilized since the supply of electric power and the control of the voltage are easy to handle.

On the other hand the recent progress in the semiconductor ARP enables the capacity thereof for the power supply for direct current to increase, which gives rise to switching from an alternating current electric arc furnace to a direct current electric arc furnace.

The electric facility of this direct current electric arc furnace is the same with that of the alternating current furnace with respect to the power supply including a transformer. In case of the direct current electric arc furnace the electric voltage is lowered by the transformer to the level required by the furnace and alternating current is rectified to direct current by a rectifier such as a thyrister. In such a thyrister system a direct current reactor is utilized to prevent the excessive increase of the electric current when the direct current system is shortcircuited. The direct current circuit is composed of a primary conductor, or a circuit from the rectifier to an anode and a secondary conductor, or a circuit from a movable carbon electrode to the rectifier.

In the conventional alternating current electric arc furnace the number of electrodes is three. In case of a direct current electric arc furnace number of the electrodes is not necessarily three, and may be at least one. Accordingly in the direct current electric arc furnace a single electrode is possible for the furnace whose capacity is 150 tons per heat, which simplifies the structure of the furnace around the electrode, but which requires a bottom electrode for the bottom of the furnace.

FIG. 5 is a current flow diagram of a direct current electric arc furnace. As shown in FIG. 5 the secondary side terminals of the transformer 1 are connected to the alternating current terminals of the thyrister 2. The minus direct current terminals are connected to the movable electrode 6 of the direct current electric furnace 5 via the direct current reactor 4 and the conductor 3. The plus direct current terminals are connected to the bottom electrode 7 via the conductor 3a. Thus the feeding circuit A-B-C-D-E-F-G-A of the current I is composed. The bottom electrode 7 is situated at the center of the bottom of the furnace 5. The arc 10 forms an electric path between the movable electrode 6 and the steel bath 9. The holder arm 8 holds the movable electrode 6 and moves it up and down. A part of the conductor is flexible and hangs in the vicinity of the furnace 5 forming a U-shaped catenary. In this arrangement the magnetic field of the arc 10 and that of the conductor 3 interfere with each other and the position of the arc cannot be maintained at the center of the furnace 5.

As shown in FIG. 5 the magnetic field $B_1$ generated by the feeding system, cooperating with the electric current I, exerts a force "f" on the arc which moves the position of the arc from the center. As the result of this deviation the steel making reaction is accelerated at the side in the furnace where the arc is deviated. However at the other side in the furnace the reaction is retarded.

Hence the total time for steel making is increased, the total consumption of the electricity is increased and the wear of the refractory is increased due to the uneven reaction.

SUMMARY OF THE INVENTION

It is an object of the present invention to provide a direct current electric arc furnace wherein the position of the arc of the furnace is stabilized at the center of the furnace.

It is an object of this invention to provide the direct current electric furnace whereby the uniform melting is carried out which can evade the increase of the operation time, the electricity consumption and the wear of the refractory. According to the invention a direct current electric arc furnace is provided which is comprising:

a feeding system of a direct current to said direct current electric arc furnace;

a main body of the direct current electric arc furnace which contains a steel bath;

a movable electrode on top of said steel bath at the center of a roof of the direct current electric arc furnace; and a bottom electrode attached to a bottom of the direct current electric arc furnace at the position deviated from the center of said bottom of the direct current electric arc furnace, the deviated distance from the center being determined by a magnetic field, generated by a second current in the steel bath from under an arc generated by said movable electrode to said bottom electrode, which can cancel a second magnetic field generated by the current in said feeding system. The movable electrode can be deviated from the center of said roof of the direct current electric arc furnace.

The current density is desirable in the range of from 45 to 160 kiloampere. The deviated distance of the electrodes is desirable in the range of from half of the diameter of the electrode to the diameter of the electrode.

DESCRIPTION OF THE PREFERRED EMBODIMENT

The problem encountered in the related art is that due to the magnetic field generated by the feeding system the arc position is off the center of the direct current electric arc furnace. This problem is solved by cancelling the effect of the magnetic field by changing the positions of the movable electrode and/or the bottom electrode from the center of the furnace. The distance between the center of the furnace and the positions of the movable electrode and/or the bottom electrode is determined by the magnetic field generated by the feeding system.

Figure 4:
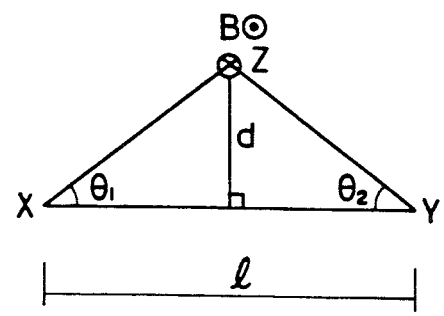
FIG. 4 is an explanatory view of the magnetic field induced by a line current.
Figure 5:
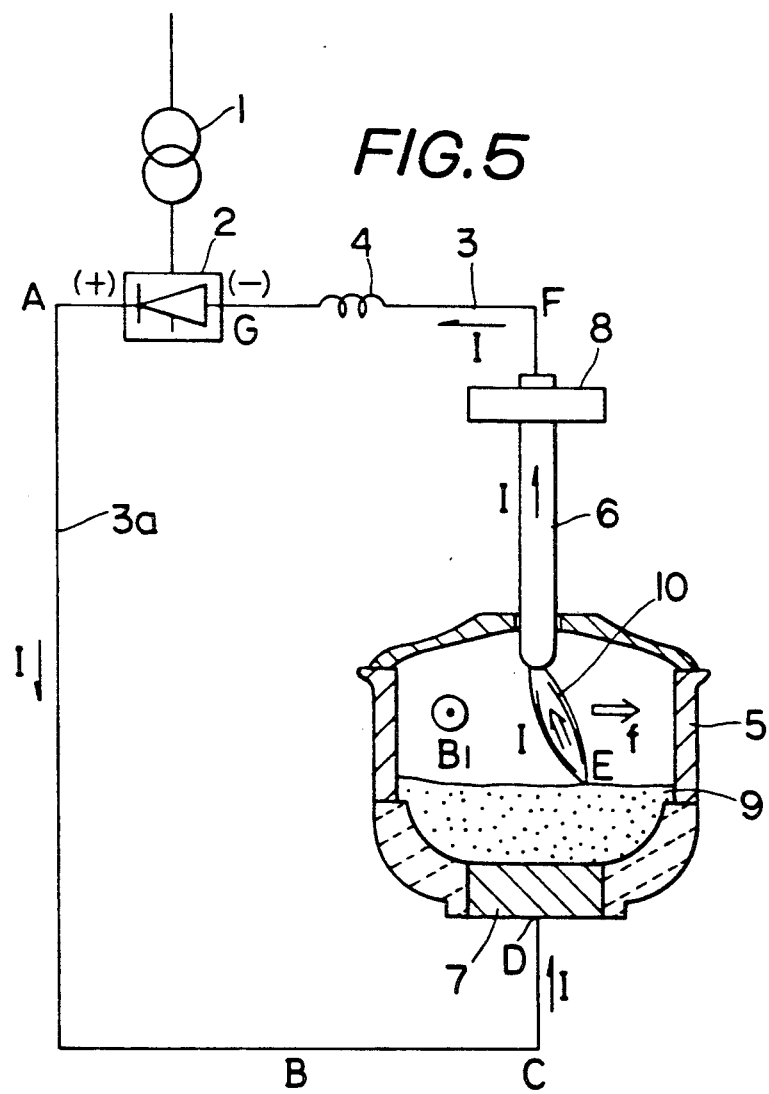
FIG. 5 is a current flow chart diagram of a direct current electric arc furnace.

FIG. 4 is an explanatory view of the magnetic field induced by a line current.

Suppose a line current having the current intensity of "I" flows along lines XY having a length "1", then the magnetic intensity at the point 2 spaced from the line XY by the distance of "d", is denoted as "B".

The angles made by the line XY and line XZ, and by the line XY and line Y Z are $\Theta_1$ and $\Theta_2$, respectively. The magnetic intensity "B" is expressed by the following equation.

$$B = I(\cos \Theta_1 + \cos \Theta_2)/4 \pi d$$

Therefore when $\Theta_1$, $\Theta_2$ and "d" are decreased, the magnetic intensity "B" is increased.

Figure 2:
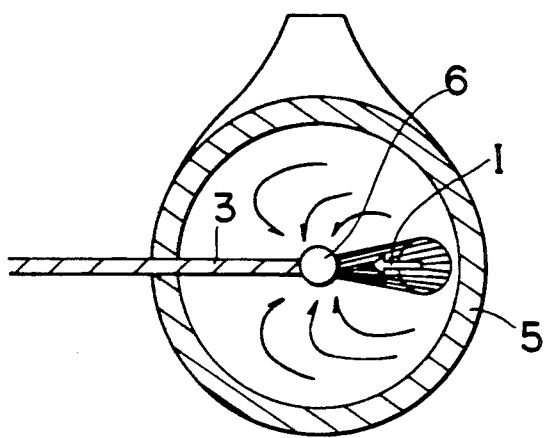
FIG. 2 and FIG. 3 are the explanatory views as for the path of the electricity at the inside of an invented direct current electric arc furnace.
Figure 3:
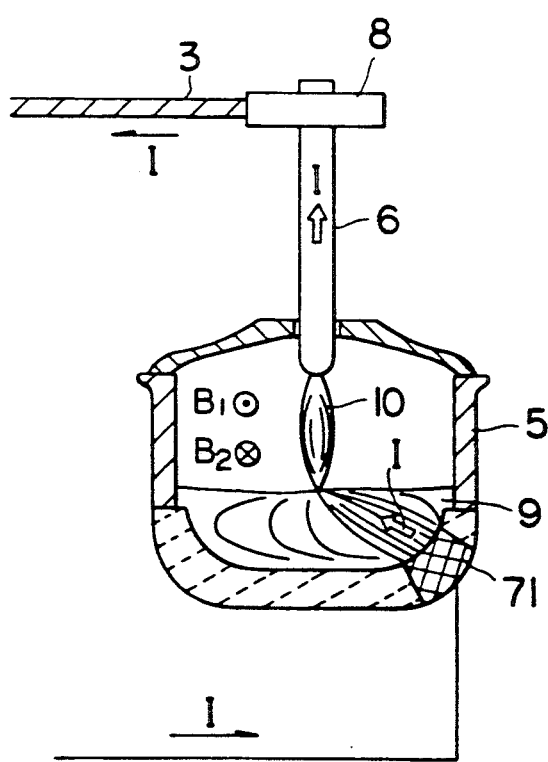

FIG. 2 and FIG. 3 are the explanatory views as for the path of the electricity at the inside of an invented direct current electric arc furnace.

FIG. 2 is a sectional top view and FIG. 3 is a sectional side view. In this case the bottom electrode 71 is arranged at the position off the center of the bottom of furnace 5, whereas the movable electrode 6 held by the holder arm 8 is situated at the center of the roof of the furnace. The density of the current I is shown in both Figures as a vector field.

The magnetic field generated by the electric current in the steel bath 9 from under the arc 10 to the bottom electrode 71 is denoted as $B_2$, whereas the magnetic field generated by a feeding system of the direct current electric arc furnace is denoted as $B_1$, in FIG. 3. The sense of the magnetic field $B_1$ is towards above the paper and the sense of the magnetic field $B_2$ is toward below the paper. As shown in FIG. 4, the magnetic field $B_2$ is in the vicinity of the arc 10. Therefore the magnetic field $B_2$ is more influential than the magnetic field $B_1$ of the outside feeding system which is explained through FIG. 4.

As for the position of the moving electrode with respect to the center of the furnace and the position of the bottom electrode to the center thereof, these positions can be moved from the center of the furnace to cancel the magnetic field caused by the outside feeding system. However the change of the position of the bottom electrode is superior to that of the moving electrode since the moving mechanism of the moving electrode is complex and expensive, and the bottom electrode can easily be attached to the bottom.

This invented system is applicable to the direct current electric arc furnace with the capacity from 50 to 250 ton per charge. When the capacity is under 50 ton per charge, the magnetic field caused by the feeding system is not as influential as to deviate the part of the arc which touches the steel bath off the center thereof. When the capacity is over 250 ton per charge, the deviated distances of these electrodes from the center are too large, and the uniform reaction of the steel bath is not attainable.

This invented system is applicable to the direct current electric arc furnace with the current density from 45 to 160 kiloampere. When the current density is under 45 kiloampere, the effect of the magnetic field caused by the outer feeding current is negligible. When the current density is over 160 kiloampere, the deviated distances of these electrodes from the center are too large, the uniform reaction of the steel bath is not attainable.

This invented system is applicable to the direct current electric arc furnace with the deviation of the movable electrode or the bottom electrode by the distance from half of the diameter of the electrode to the diameter of the electrode. When the deviated distance is under half of the diameter of the electrode, the effect of the deviated electrode to cancel the influence of the magnetic field caused by the outer feeding system is negligible. When the deviated distance is over the diameter of the electrode, the deviated distances of these electrodes from the center are too large, and the uniform reaction of the steel bath is not attainable.

EXAMPLES

Example 1

Figure 1:
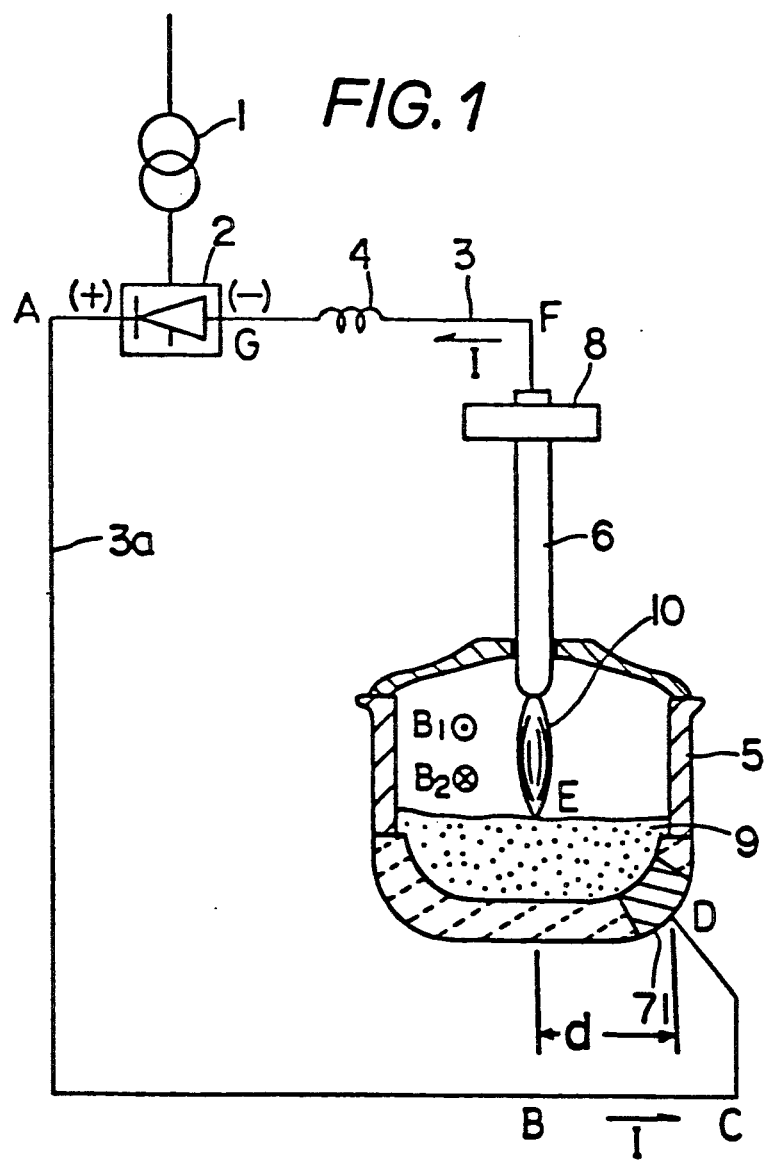
FIG. 1 Is an embodiment of the invention.

FIG. 1 is an embodiment of the invention. As shown in FIG. 1, the secondary side terminals of the transformer 1 are connected to the alternating current terminals of the thyrister 2. The minus terminals of the thyrister 2 is connected to the movable electrode 6 of the direct current electric arc furnace 5 via the direct current reactor 4 and the conductor 3. The plus terminal of the thyrister 2 is connected to the bottom electrode 71 via the conductor 3a. Thus the feeding circuit A-B-C-D-E-F-G-A of the current I is composed. The bottom electrode 71 is situated off the center of the bottom of the furnace. The magnetic field of the feeding system F-G-A-B-C is cancelled by the magnetic field $B_2$ generated by the electric current in the path of electricity DE. Since the path of the electricity is in the vicinity of the arc 10, the magnetic field $B_2$ generated by the path of electricity DE is more influential than the magnetic field of the feeding system.

Example 2

Figure 6:
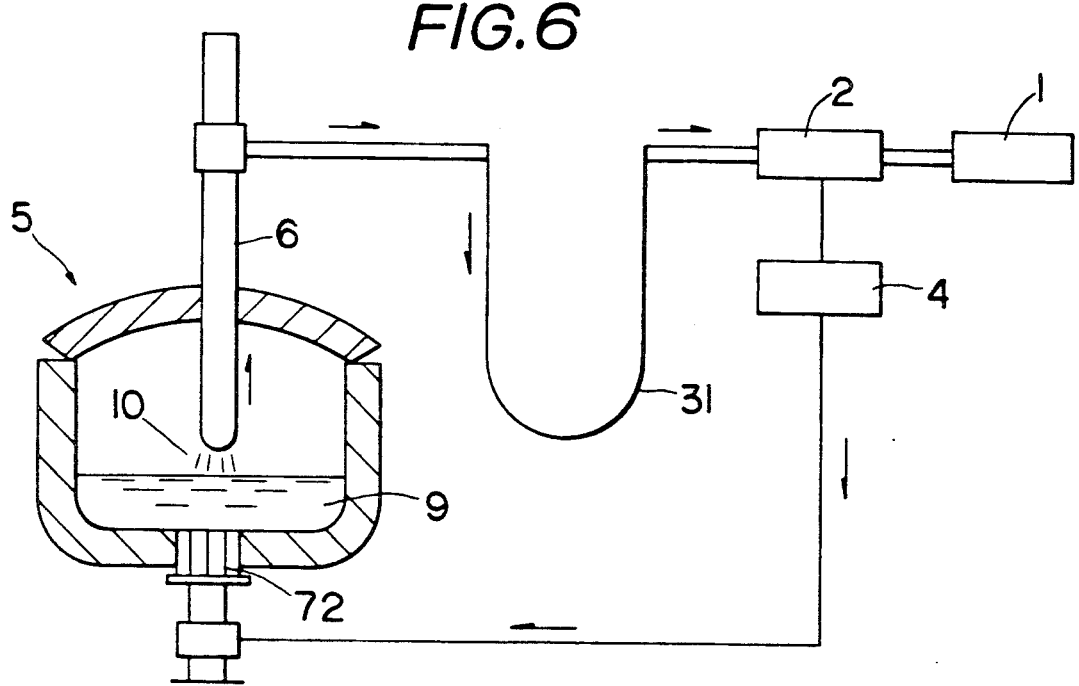
FIG. 6 is an embodiment of the invention.

FIG. 6 is an embodiment of the invention. As shown in FIG. 6, the transformer 1 which lowers the voltage of the outside electric supply, the thyrister 2 which rectifies the alternating current from the transformer 1 and the direct current reactor 4 which smoothes the ripple of the electric current are arranged in this feeding system. At the bottom of the direct current electric arc furnace 5 wherein the steel bath 9 is processed, the bottom electrode 72 is arranged. At the top of the furance the movable electrode 6 is arranged. The movable electrode 6 and the thyrister 5 are connected by a power supply line, part of which is the flexible feeding cable 31. The flexible feeding cable 31 enables the movable electrode to move up and down and hangs in the vicinity of the movable electrode 6. The arrow in the diagram shows the direction and the sense of the electric current. The electric current rectified to a predetermined voltage by the transformer 1 and the thyrister 2, is conducted to the direct current reactor 4, the bottom electrode 72, the steel bath 9, the arc 10, the movable electrode 6 and the flexible feeding cable 31 as shown by the arrow. When the movable electrode 6 and the bottom electrode 72 are at the center of the furnace, the arc 10 is deviated by the magnetic field of the outside feeding system. However as shown in FIG. 6, the position of the movable electrode is off the center of the furnace and approaches the flexible feeding cable 31 and position of the bottom electrode 72 is also off center and leaves from the flexible feeding cable 31. By this arrangement of these electrodes the deviation of the position of the arc 10 is cancelled, and the position is maintained at the center of the furnace, which leads to the symmetrical reaction of the steel making.

What is claimed is:

1. A direct current electric arc furnace comprising: a main body having:
   a vertical axis;
   a top section having a center portion positioned on said vertical axis; and
   a bottom section adapted to hold a molten metal bath, and said molten metal bath having a top surface, and said bottom section having a center portion positioned on said vertical axis below said top portion;
   an electrical feed system for feeding a direct current to said main body, said electrical feed system including:
      a movable electrode having a diameter and a central portion, said movable electrode being positioned in said main body above said top surface of said molten metal bath; and
      a bottom electrode having a diameter and a central portion, said bottom electrode being attached to the bottom section of the main body;
   said electrical feed system when feeding a direct current to said movable electrode and to said bottom electrodes producing an arc substantially on the vertical axis of said main body between said top surface of said molten metal bath and the movable electrode;
   the flow of the direct current in said electrical feed system producing a first force in said molten metal bath which acts in a first direction to move the arc away from said vertical axis of the main body;
   at least the central portion of the bottom electrode being spaced apart by a distance "d" from the vertical axis of the main body in a direction perpendicular to said vertical axis;
   the spaced apart position of the central portion of the bottom electrode from the vertical axis of said main body causing an induced current to flow in said molten metal bath when said direct current is flowing through said electrical feed circuit, said induced current flowing between a portion of the top surface of the molten metal that is substantially directly below said arc to said bottom electrode, the flow of said induced current in said molten metal bath creating a second force in said molten metal bath which acts to at least partially oppose said first force; and
   the distance "d" being preselected to control the induced current flowing in said molten metal bath, to thereby at least partially control said second force whereby the position of the arc substantially on said vertical axis can be maintained by controlling said second force to at least partially oppose said first force.

2. The direct current electric are furnace of claim 1, wherein the movable electrode is also spaced apart the distance "d" from the vertical axis.

3. The direct current electric arc furnace of claim 1, wherein the direct current electric arc furnace is adapted to hold a charge of from 50 to 250 tons.

4. The direct current electric arc furnace of claim 2, wherein the direct electric arc furnace is adapted to hold a charge of from 50 to 250 tons.

5. The direct current arc furnace of claim 1, wherein the electrical feed system supplies direct current having an amperage of from 45 to 160 kiloamperes.

6. The direct current electric arc furnace of claim 2, wherein an amperage of the direct current supplied by the electrical feed system is from 45 to 160 kiloamperes.

7. The direct current electric arc furnace of claim 3, wherein an amperage of the direct current supplied by the electrical feed system is from 45 to 160 kiloamperes.

8. The direct current electric arc furnace of claim 4, wherein an amperage of the direct current supplied by the electrical feed system is from 45 to 160 kiloamperes.

9. The direct current electric arc furnace of claim 1, wherein the distance "d" is preselected to be equal to at least half the diameter of at least one of the movable and the bottom electrode and not more than the diameter of the at least one electrode.

10. The direct current electric arc furnace of claim 3, wherein the distance "d" is preselected to be equal to at least half the diameter of at least one of the bottom electrode and the movable electrode and not more than the diameter of the at least one electrode.

11. The direct current electric arc furnace of claim 5, wherein the distance "d" is preselected to be equal to at least half the diameter of at least one of the bottom electrode and the movable electrode and not more than the diameter of the at least one electrode.

12. THe direct current electric arc furnace of claim 7, wherein the distance "d" is preselected to be equal to at least half the diameter of at least one of the bottom electrode and the movable electrode and not more than the diameter of the at least one electrode.

13. The direct current electric arc furnace of claim 1, wherein said molten metal is steel.

* * * * *